US011483574B2

(12) United States Patent
Coza

(10) Patent No.: US 11,483,574 B2
(45) Date of Patent: Oct. 25, 2022

(54) SYSTEMS AND METHODS FOR EMOTION AND PERCEPTION BASED VIDEO COMPRESSION AND VIDEO PERCEPTION ENHANCEMENT

(71) Applicant: Aurel Coza, Tempe, AZ (US)

(72) Inventor: Aurel Coza, Tempe, AZ (US)

(73) Assignee: Arizona Board of Regents on behalf of Arizona State University, Tempe, AZ (US)

(*) Notice: Subject to any disclaimer, the term of this patent is extended or adjusted under 35 U.S.C. 154(b) by 0 days.

(21) Appl. No.: 17/134,845

(22) Filed: Dec. 28, 2020

(65) Prior Publication Data
US 2021/0203955 A1 Jul. 1, 2021

Related U.S. Application Data

(60) Provisional application No. 62/953,732, filed on Dec. 26, 2019.

(51) Int. Cl.
H04N 19/162 (2014.01)
H04N 19/117 (2014.01)
H04N 19/167 (2014.01)
G06N 20/00 (2019.01)
G06K 9/62 (2022.01)
H04N 19/184 (2014.01)
G06V 20/40 (2022.01)

(52) U.S. Cl.
CPC ......... H04N 19/162 (2014.11); G06K 9/6257 (2013.01); G06N 20/00 (2019.01); G06V 20/46 (2022.01); H04N 19/117 (2014.11); H04N 19/167 (2014.11); H04N 19/184 (2014.11)

(58) Field of Classification Search
None
See application file for complete search history.

(56) References Cited

U.S. PATENT DOCUMENTS 10,529,113 B1 * 1/2020 Sheikh ............... G06K 9/00302
2019/0392266 A1 * 12/2019 Zhong ................ G06K 9/00302
2020/0401938 A1 * 12/2020 Etkin .................. G06V 10/768

OTHER PUBLICATIONS

Shannon, et al., The Mathematical Theory of Communication, Univ of Illinois Press, 1949.

(Continued)

Primary Examiner — Samuel D Fereja
(74) Attorney, Agent, or Firm — Polsinelli PC

(57) ABSTRACT

A computer-implemented system and associated methods are disclosed including a processor and a camera. The processor is adapted to map emotional responses to video characteristics in view of reaction data as captured from the camera as the camera records being displayed a plurality of video data streams and also records the user response in view of modifications to the plurality of data streams. The map is implemented by the processor to generate revised or altered versions of the underlying video data streams for predetermined applications. Portions of the revised versions of the plurality of video data streams determined by the map to trigger an emotional response may be reduced, minimized, compressed, enhanced, altered, or otherwise modified in view of the corresponding emotional response as desired.

14 Claims, 9 Drawing Sheets
(6 of 9 Drawing Sheet(s) Filed in Color)

(56) References Cited

OTHER PUBLICATIONS

Biscaia, et al., The effects of emotions on football spectators' satisfaction and behavioural intentions, European Sport Management Quarterly, 12(3), 227-242, 2012.
Niese, et al., I can see myself enjoying that: Using imagery perspective to circumvent bias in self-perceptions of interest, Journal of Experimental Psychology, 218, 2019.
Rasheed, et al., Movie genre classification by exploiting audio-visual features of previews, in Object Recognition Supported by User Interaction for Service Robots (IEEE, 2002), vol. 2, pp. 1086-1089, 2002.
Wiegand, et al., Overview of the H.264 / AVC Video Coding Standard (PDF), IEEE Transactions on Circuits and Systems for Video Technology, Jul. 2003.

* cited by examiner

*Application 1: Video live broadcasting or post processing*

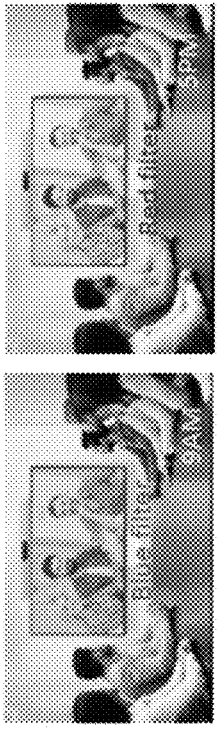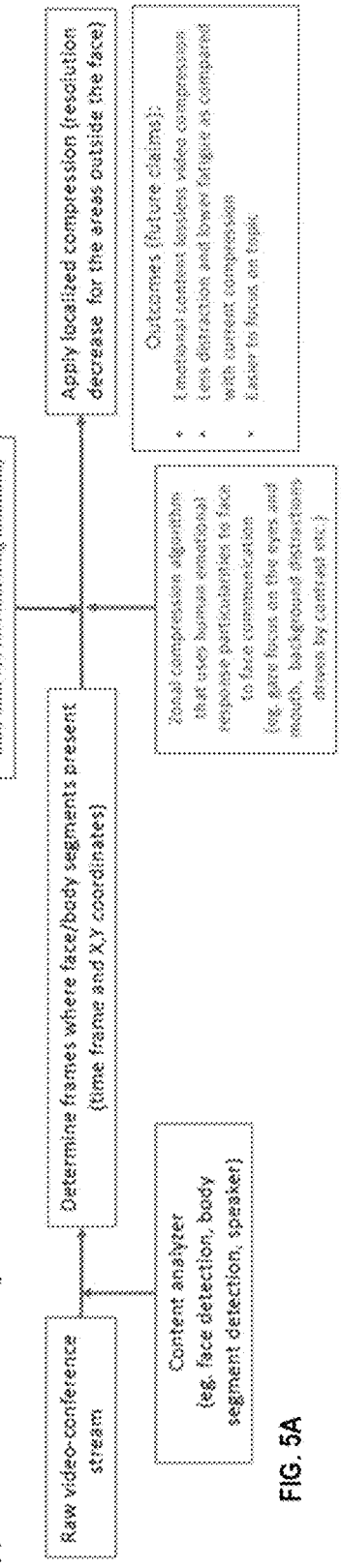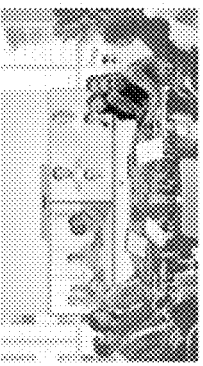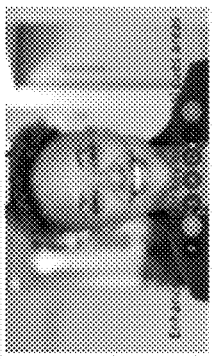
FIG. 5A, FIG. 5B, FIG. 5C, FIG. 5D, FIG. 5E

SYSTEMS AND METHODS FOR EMOTION AND PERCEPTION BASED VIDEO COMPRESSION AND VIDEO PERCEPTION ENHANCEMENT

CROSS REFERENCE TO RELATED APPLICATIONS

The present document is a non-provisional application that claims benefit to U.S. Provisional Application Ser. No. 62/953,732, filed on Dec. 26, 2019, which is herein incorporated by reference in its entirety.

TECHNICAL FIELD

The present disclosure relates to video communication and signal compression technologies; and more particularly, to systems and methods for modifying signal parameters include video content features according to predetermined emotional objectives, the process of modifying signal parameters being suitable in one application for signal compression and customized alteration; e.g., degrading predetermined non-important signal content parameters and/or enhancing other specific content predetermined to be associated with emotional and attention-relevant content.

BACKGROUND

From an information theory perspective, any form of electronic broadcasting or communication carries a certain amount of (uniquely quantifiable) information that occupies a given bandwidth in the propagation medium. Using the appropriate decoders, the information can be converted back into the original signal and assuming a lossless communication channel, the entropy of the signal does not change between broadcaster and receiver. Signal compression is generally known as the use of various methods to increase the quality or quantity of the information (such as signal parameters) transmitted through the propagation medium.

Current compression methods consist of 'mathematical opportunity' driven compression schemes that are dictated primarily by the nature of the images (e.g., areas of no change between frames are compressed). However, these methods have various drawbacks. For example, such methods are limited by the intrinsic properties of the images and average psychophysics observations. Furthermore, blanket image compression (such as resolution change) can alter the viewer emotional response to a specific content, a significant drawback for emotionally charged content such as the vast majority of the current media content.

It is with these observations in mind, among others, that various aspects of the present disclosure were conceived and developed.

BRIEF DESCRIPTION OF THE DRAWINGS

The application file contains at least one photograph executed in color. Copies of this patent application publication with color photographs will be provided by the Office upon request and payment of the necessary fee.

FIG. 5A is a process flow diagram related to another application of the system of FIG. 1 for video conferencing and applying a localized color filter.

FIG. 5B is a photograph illustrating application of a blue filter.

FIG. 5C is a photograph illustrating application of a red filter.

FIG. 5D is a photograph illustrating higher resolution being applied to a speaker of a presentation.

FIG. 5E is a photograph illustrating higher resolution being applied to certain portions of an image to enhance certain predetermined facial cues.

Corresponding reference characters indicate corresponding elements among the view of the drawings. The headings used in the figures do not limit the scope of the claims.

DETAILED DESCRIPTION

Introduction

Figure 1:
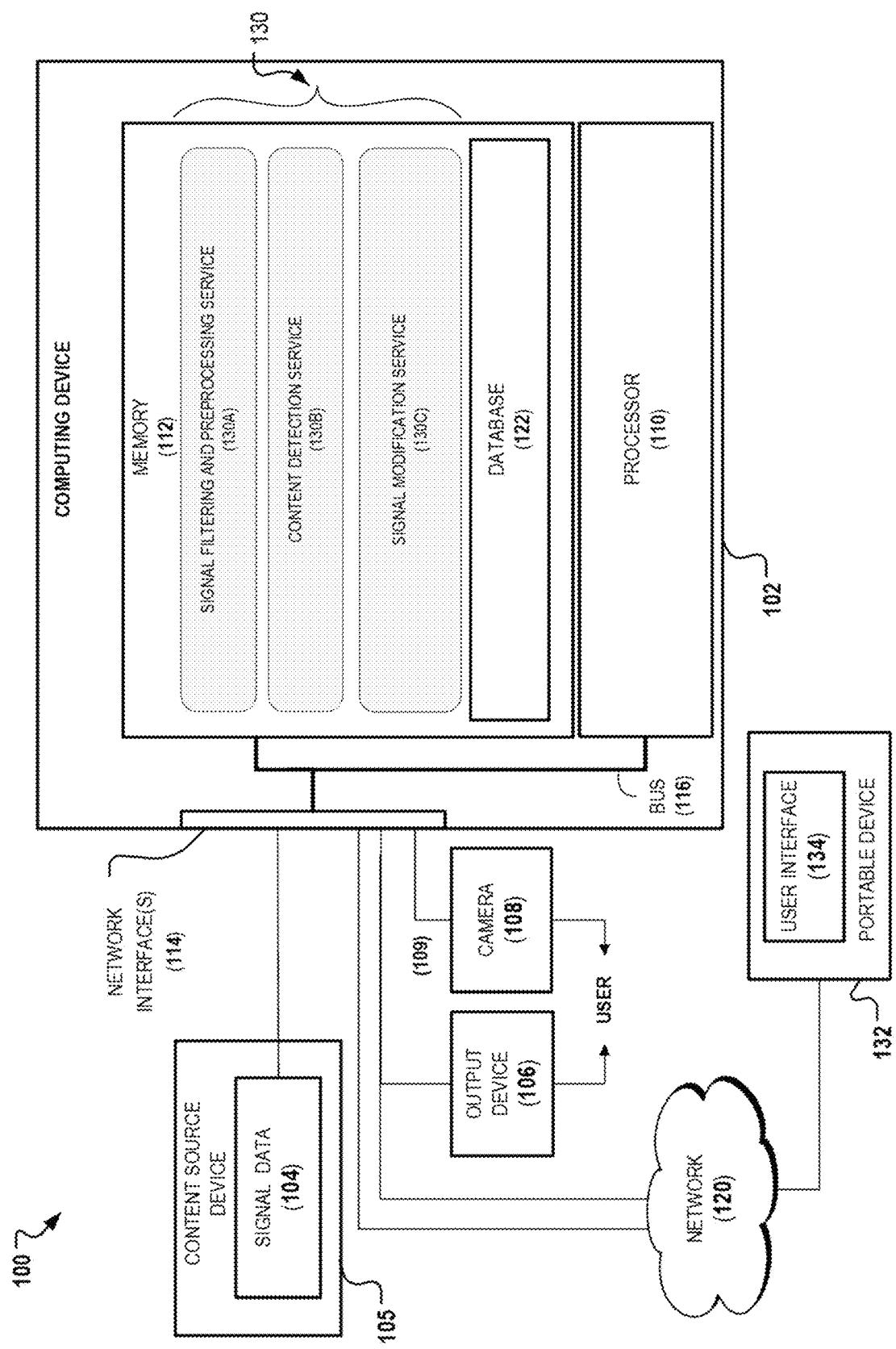
FIG. 1 is a diagram of a general system for emotion-based signal alteration and compression that include embodiments for degrading predetermined non-important signal content parameters and/or enhancing other specific content predetermined to be associated with e.g., emotional content or content with predefined emotion-based characteristics.

Where a receiver of information (sent by a broadcaster) is a human being (viewer/listener), the decoding of information transmitted to the receiver depends strongly on the viewer's preferences, prior knowledge, attention, and myriad other individual characteristics that are generally outside the influence of a broadcaster. In general, the information is received and processed by viewers at two levels: (a) informational and (b) emotional. However, very little (beyond anecdotal evidence) is known about the emotional perception of degraded signals such as phone voice compression (band block), Fourier compression (MP3) or other forms of compression. Even less is known about the ability of compressed images (video) to elicit the emotional message they were intended to elicit. Furthermore, most broadcasting (and any video content in general) is made to appeal to the viewer's emotional senses, and typically conveys very little factual information (one can read the key stats of a two-hour game in 10 seconds or less). In this context, understanding the impact of compression on the emotions the signal elicits (or fails to elicit) is paramount. For certain applications (e.g., video conferencing), the correct emotional response is desired given the objective of such technologies to be a facsimile for face to face meetings. Being able to differentially enhance body movement or a facial expression has the potential to create a natural meeting experience.

Current compression methods do not consider the informational, emotional, and perceptual content of specific sections of an image; and compressed videos tend to decrease the emotional value of the content. In particular for example, current compression methods employed with video conferencing solutions are notorious for not conveying the subtleties of face to face interaction (e.g., body language). Such current methods are therefore limited especially with respect to emotional perception.

In view of the above, and leveraging human factors (emotional response), the present inventive disclosure includes embodiments of a platform and methods thereof for mapping an emotional response to various video inputs of video content by systematic manipulation or modification of video features and recording the response of the user to the modifications in real time. The platform, by construction of the map, accommodates manipulation of video features in order to achieve a desired emotional change or objective; such as a desired comfort or productivity level, by means of enhancing, decreasing, or eliminating specific emotional features of the underlying video content. Applications or embodiments of the platform may be tailored for generating emotionally enhanced video streams, emotionally suppressed video streams, and/or emotionally attuned video streams as described herein.

The present disclosure further includes embodiments of a video compression and alteration method for retaining the emotional content of a video while achieving comparable or higher compression rates for a given average resolution. In some embodiments, the disclosed methods of the present disclosure involve degradation of the resolution of predetermined properties of a certain video or time sequence that is known based on human perception data to have no significant impact on the informational and emotional/perceptual quality of the video; and/or enhancing other predetermined specific areas that are known to be responsible or associated with the emotional content of a video or other signal. The disclosed methods can achieve higher theoretical compression rates while leaving unaltered the information and emotional perception of the predetermined specific areas that are known to be responsible or associated with the emotional content and it can enhance the emotional response for the same level of compression. In other words, with the disclosed methods, using specific knowledge related to visual areas of focus and the differential emotional responses to various resolution and color filters, an enhanced video conferencing experience can be delivered while preserving or enhancing the current compression rates.

Referring to FIG. 1, a computer-implemented system (hereinafter "system") 100, is shown which may be implemented for signal modification (e.g., modification to video content of one or more video data streams) and/or compression as described herein. In general, the system 100 includes at least one of a computing device 102 that accesses signal data 104 from a content source device 105 (or any source), such as a content server. In some embodiments, the system 100 includes an output device 106 in operable communication with the computing device 102 and/or the content source device 105 for displaying or otherwise presenting aspects of the signal data 104 to a user in some form (e.g., a display for displaying video), and a camera 108 for recording the user and generating reaction data 109 defining emotional reactions or expressions as the user e.g. views the signal data 104 via the output device 106. In general, the computing device 102 inputs or accesses the signal data 104 and executes functionality or is otherwise configured for emotion/perception-based compression and alteration. In some embodiments, the computing device 102 leverages the reaction data 109 from the camera 108 to detect an emotional response by the user to the signal data 104 to alter and/or compress the signal data 104 based on some predetermined emotional characteristic objective, as further described herein.

In some embodiments, the computing device 102 includes a processor 110, a memory 112 of the computing device 102 (or separately implemented), a network interface (or multiple network interfaces) 114, and a bus 116 (or wireless medium) for interconnecting the aforementioned components. The network interface 114 includes the mechanical, electrical, and signaling circuitry for communicating data over links (e.g., wired or wireless links) associated with a network 120 (e.g., the Internet, a Bluetooth connection, a local area network (LAN), and the like). The network interface 114 may be configured to transmit and/or receive the signal data 104 using a variety of different communication protocols, as will be understood by those skilled in the art.

As indicated, via the network interface 114 or otherwise, the computing device 102 accesses the signal data 104 from the content source device 105. Alternatively, the signal data 104 may be fed directly to the computing device 102 or accessed via any source. In general, once the signal data 104 is accessed and/or stored within a database 122, the processor 110 executes a plurality of services 130 to perform any number of functions or computations using the signal data 104 as inputs. For example, the processor 110 may execute the signal filtering and preprocessing service 130A to initially format the signal data 104 to predefined specifications, the content detection service 130B may be executed to identify portions of the signal data associated with predetermined areas of interest associated with emotion, and the signal modification service 130C may further be executed to modify (e.g., compress and/or alter) portions of the signal data 104 (using localized or zona compression algorithms), as further described herein.

The plurality of services 130 may include any number of components or modules executed by the processor 110 or otherwise implemented. Accordingly, in some embodiments, one or more of the plurality of services 130 may be implemented as code and/or machine-executable instructions executable by the processor 110 that may represent one or more of a procedure, a function, a subprogram, a program, a routine, a subroutine, a module, an object, a software package, a class, or any combination of instructions, data structures, or program statements, and the like. In other words, one or more of the plurality of services 130 described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium (e.g., the memory 112), and the processor 110 performs the tasks defined by the code.

The system 100 is non-limiting and additional components would be appreciated by those of ordinary skill in the art. In some embodiments, for example, the computing device 102 is in operable communication with any number or type of a portable device 132, which may correspond to an individual end user device desiring to stream the signal data 104 in some form. The portable device 132 may include a smartphone, laptop, tablet, or other portable device that may be used to execute a user interface 134 and to access aspects of the signal data 104 after the compression or other processing methods are applied to the signal data 104 by the computing device 102. The portable device 132 may include a camera (not shown) for returning reaction data to the computing device 102. In addition, although not depicted, the system 100 may leverage data from other external devices, such as computing or storage devices with access to machine learning functionality, data libraries, and the like.

Numerous possible embodiments of the system 100 are contemplated. For example, in one embodiment of the system 100 the content detection service 130B defines a content characteristics detection (classification) module, and the signal modification service 130C includes a selective image compression module working cooperatively to selectively compress various areas of the signal data 104 using specific pre-determined human emotional/perceptional knowledge. In this embodiment, with video for example, pre-recorded or live broadcast video can be compressed selectively in order to achieve high compression rates while leaving unaltered the emotional content of the video.

In a different embodiment, the signal modification service 130C may be used as an emotional filter, by means of selectively de-emphasizing or emphasizing certain areas of an image of the signal data 104 that are known to elicit specific emotional responses. In this embodiment, the desired effect is not emotional compression transparency but selective emotional enhancement (emotional tuning). For instance, human faces represent the vast majority of the gaze focus and carry most of the emotional information. As a consequence, those sections of an image associated with the signal data 104 containing faces would not be altered while backgrounds and innate objects would be de-emphasized (resolution drop).

In the case of video conferencing, an additional layer of image alteration may be performed by the signal modification service 130C that takes into account the time of the day and even weather on the receiving end. Thus, a red shifted filter can be used for evening or overcast receiving timezones while a blue shifted filter can be used for sunny, morning timezones. This additional feature minimizes the emotional dissonance between various locations.

In one embodiment, the computing device 102 of the system 100 may be implemented to generate a mathematical function or predictive model that ties signal quality to emotional response that may be applied to optimize signal compression while maintaining a desired level of emotional engagement by a viewer. Further, the computing device 102 of the system 100 may be implemented to generate a visual attention/emotional map that codifies areas of high and low impact in the frame of view (FOV). Existing video content could be compressed differentially (low resolution for low visibility areas and high resolution for areas of interest) using e.g., a raster wavelet compression technique. The processed video could then be viewed by tested for efficacy of the system 100 by monitoring the viewing of the processed video by a predetermined number of subjects for a target population, and quantifying emotional and informational perception, and comparing such testing with video of unaltered or homogenous compress videos using different compression factors.

In general, the system 100 is configured to execute functionality for human selective perception driven compression, emotional content transparent compression, a unique video post processing emotional filter that can be used to alter emotional response of the viewer (without the need to change the actual content), and a time zone aware video filter to minimize emotional dissonance. As such, the system 100 includes or is otherwise capable of providing significantly higher compression rates for areas of image that are least important for human perception, selective compression that leaves emotional response unaltered, codec based emotional tuning (post process), and a time and location adaptive video filter.

Figure 2A:
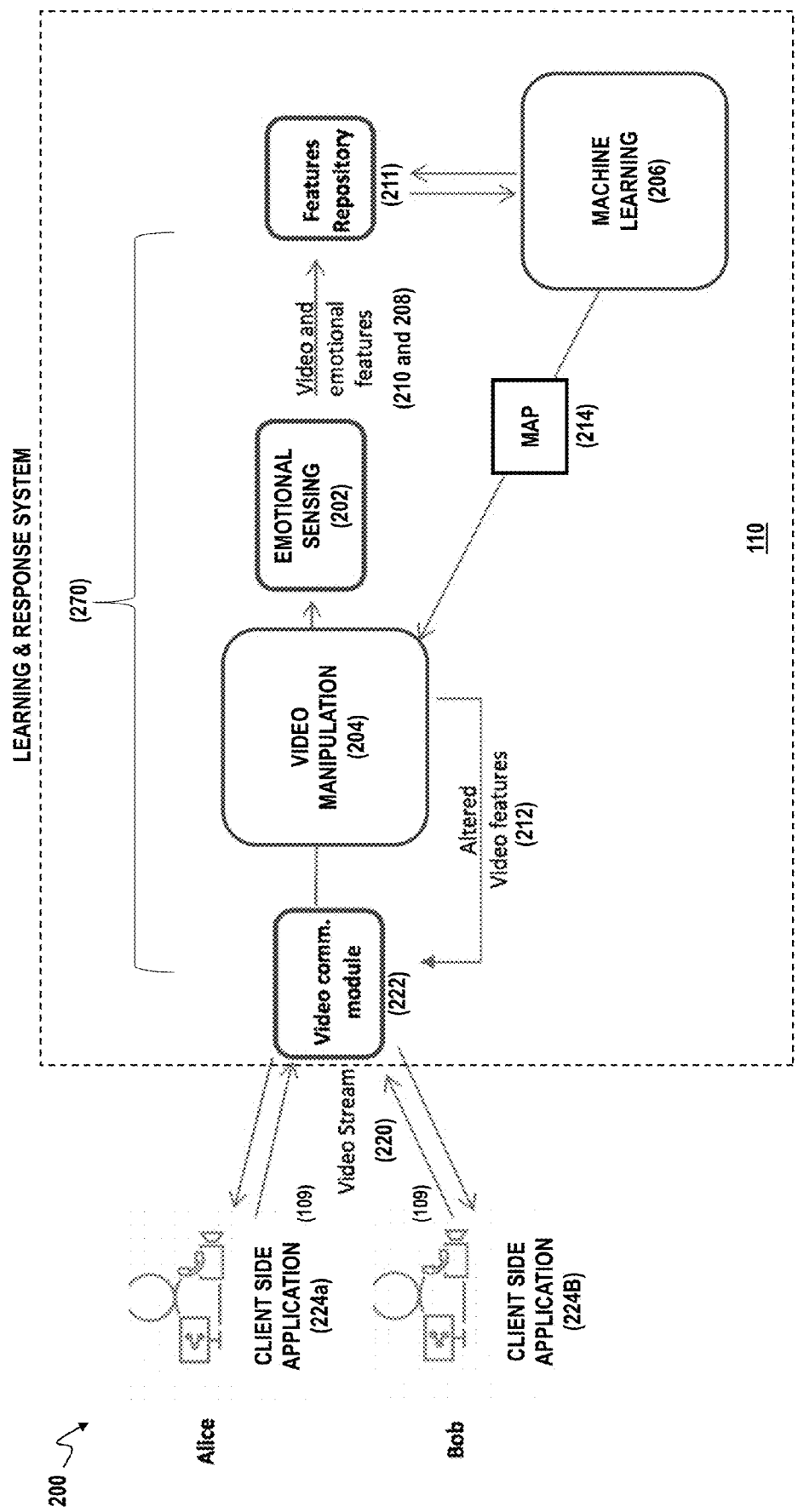
FIG. 2A is an illustration of an automated video communication emotional learning and response alteration platform for tailoring video content based on emotional feedback as detected.

Referring to FIG. 2A, a software platform 200 is shown, which may be a subcomponent of the plurality of services 130 or an entirely separate software component executable by the computing device 102. In general, the software platform 200 is configured to accommodate manipulation of one or more video properties, and record an emotional response to the video properties. Using the platform 200, video images can be manipulated efficiently and in a very systematic and precise manner. Furthermore, the platform 200 doubles as an emotional sensing (response) tool that provides emotional response feedback virtually instantaneously. By non-limiting example, the platform 200 includes three main modules (collectively forming a system 270): an emotional sensing module 202, a video manipulation module 204, and a machine learning (analytics) module 206. In general, the emotional sensing module 202 includes any number of software methodologies for detecting and quantifying an emotional expression at different levels, such as a facial expression, a voice emotional recognition, and any other means of emotion quantification. Any emotion sensing solutions can be used to quantify the impact of video manipulation (or original emotion-eliciting features) upon an individual or a group that elicits an emotional response. As indicated in FIG. 2A, the emotional sensing module 202 is implemented (by the processor 110 or otherwise) to detect or otherwise identify emotion features 208 and to further detect corresponding video features 210 that elicit or are otherwise believed to be the cause of the any emotion features 208 detected, as further elaborated upon herein. As indicated, both of the emotion features 208 and the video features 210 may be stored in a features repository 211 for access and processing by the machine learning module 206.

In general, the video manipulation module 204 is a bidirectional video processing module that includes at least a codec, the camera 108, and processing components (e.g., processor 110 or otherwise) that works in cooperation with the emotional sensing module 202 to accommodate on-the-flight or real-time manipulation of any number of video properties through options in the configurable components. By non-limiting examples, the following video properties can be manipulated to achieve a desired emotional response: image tonality (change systematically the prevalent video image tone), resolution (allows for the overall and zonal change), and the field of view (digital zoom/proximity simulator). In some embodiments, changes to video properties as described are changes applied to the video features 210 of an underlying video data stream or plurality of video data streams. As indicated above, such changes to the video features 210 are intended to elicit some change in an emotional response corresponding to emotion features 208. Changes to the video features 210 applied by the processor 110 or otherwise naturally lead to the generation of altered features 212 or modified features of the underlying video data stream or plurality of video data streams. In other words, the video properties of the underlying video data stream or plurality of video data streams with altered features 212 are manipulated or changed in some form to elicit a change in the emotional response of a user viewing the underlying video data stream or plurality of video data streams.

The machine learning module 206 (shown in FIG. 2C) includes a data aggregation and continuous learning loop centered around a machine learning processor/method. The machine learning module 206 allows one to:

(a) create an approximate map (214) of Video-Properties: Emotional-Response interaction for specific applications (b) refine the emotional response map 214—in near real time—for different applications and (c) run it for commercial purposes on various video communication platforms.

Figure 2B:
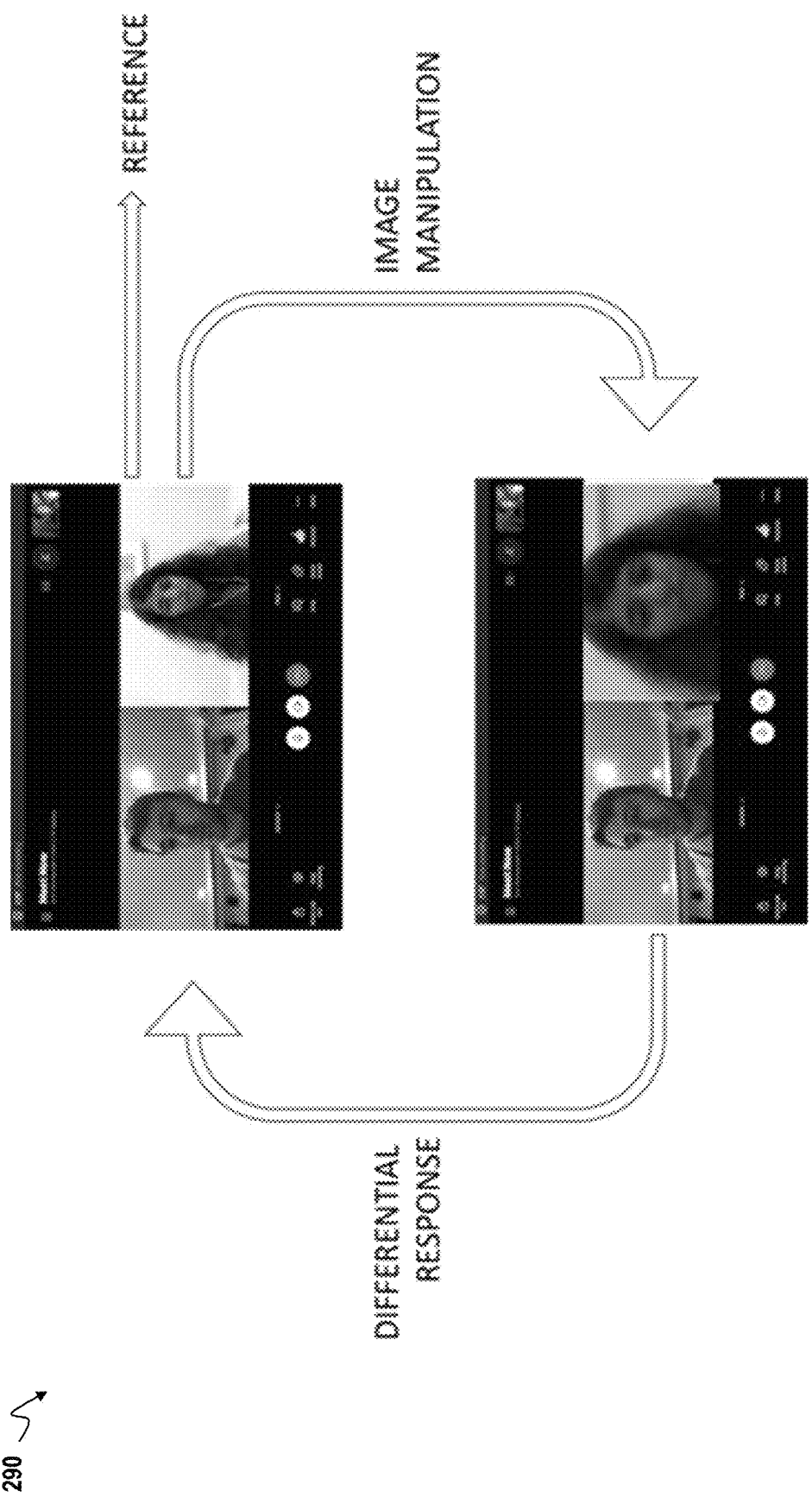
FIG. 2B is an illustration including photographs depicting a basic visual description of image communication flow using the platform of FIG. 2A.
Figure 2C:
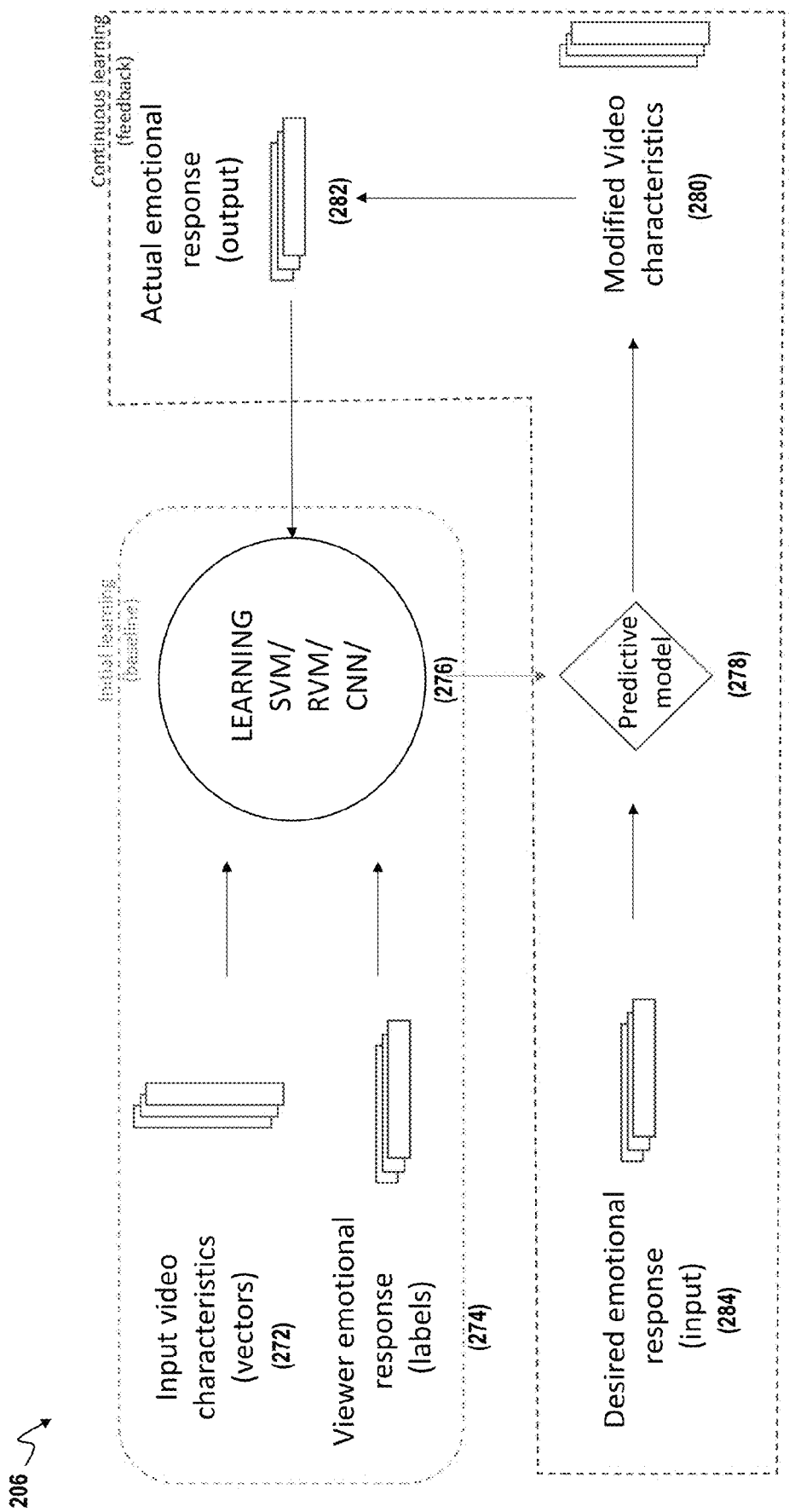
FIG. 2C is an illustration of one embodiment of a machine learning module that may be implemented to customize video content as described herein.

As shown in FIG. 2C, in some embodiments the machine learning module 206 utilizes a mathematical and algorithmic approach similar to the SLAM (Simultaneous Localization and Mapping) method for automated mapping (Tsubouchi, 2019). Given an existing (complex) visual space continuously probing the response to changes in emotional response as the visual components are changed systematically one can create the map 214 of the emotional response (open vs forbidden spaces).

The platform 200 can be implemented or embodied in a variety of different ways for various applications. In some embodiments, the altered features 212 include changes made to the video features 210 to emotionally enhance one or more video properties. This application can be applied, for example, in video conferences where the participants can experience an emotional connection similar to that encountered in physical meeting rooms; and/or telemedicine that enhances the emotional content of the video to induce the expected patient-physician trust relationship.

In some embodiments, the altered features 212 include changes made to the video features 210 to emotionally suppress one or more video properties. This application can be applied, for example, with unmanned aerial vehicle (UAV) video feeds that suppress the emotional component and thus avoid the potential for post-traumatic stress disorder (PTSD) and delayed decisions in drone pilots; and/or productivity tools that void presentations of emotional content for efficient communication.

In some embodiments, the altered features 212 include changes made to the video features 210 to emotionally attune one or more video properties. This application can be applied, for example, in a scenario where participants from different time zones that experience a significant emotional gap can have a difficult time connecting at the emotional level—'emotional jet lag'. Manipulating the video feed on both ends can minimize the emotional gap thus bringing both groups towards a common emotional state.

Figure 2D:
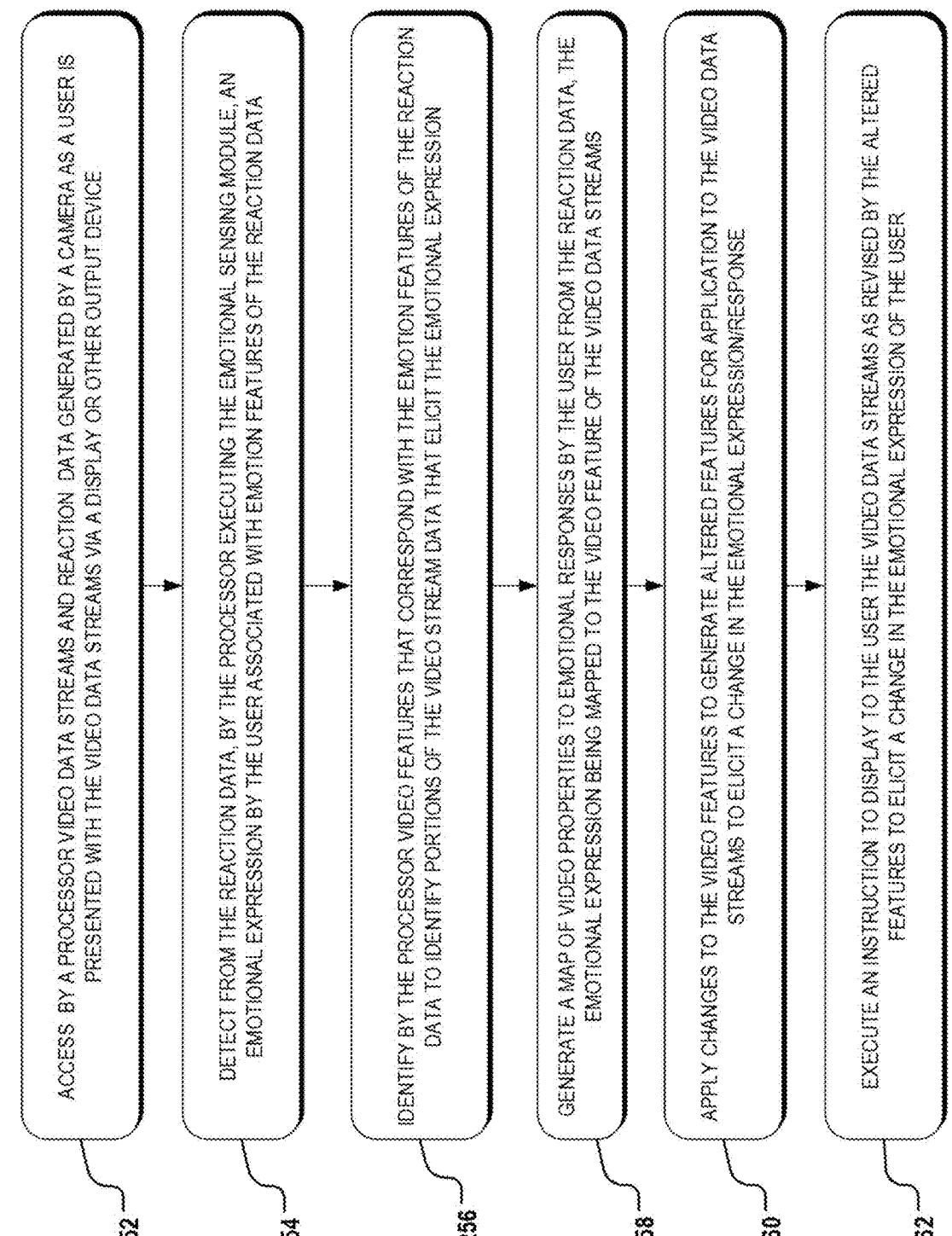
FIG. 2D is a process flow illustrating a general method for implementation of the platform of FIG. 2A to tailor video content based on emotional feedback.

Referring now to a process flow 250 of FIG. 2D and with continuing reference to FIG. 2A, one general method of manipulating video content/properties to elicit a change in an emotional response is shown. In block 252, data from one or more video data streams 220 is displayed (by, e.g., output device 106) or otherwise presented to a user (e.g., "Alice" and "Bob" in FIG. 2A), and the user's reaction to the video data streams as displayed is recorded as the reaction data 109 by a camera, such as camera 108. As indicated in FIG. 2A, the video data streams 220 may be presented to multiple users (224A and 224B), each associated with their own display and camera equipment configured to return the reaction data 109 to the processor 110 of the computing device 102 or other receiving device by any wired or wireless communication medium/protocol. As further indicated in FIG. 2A, the processor 110 may be configured to execute and implement a video communication module 222 to facilitate the communication of data associated with the video data streams 220 and changes thereto between the processor 110 and the users, and to facilitate the communication of the reaction data 109 from the users to the processor 110.

Referring to block 254, the processor 110 is configured, by the emotional sensing module 202, to detect an emotional expression by the user. In some embodiments, the emotional expression is identified by the processor 110 from emotional features 208 corresponding to one or image frames of the reaction data 109; the emotional features 208 defining emotional characteristics including any predetermined movements, predetermined facial expressions, or predetermined changes in focus areas of an image. Any available emotion sensing solutions can be used to quantify the impact of the video manipulation on individual and group emotional response. It should be appreciated that the emotional sensing module 202 can be configured to detect an emotional expression from audio and/or audio-video combinations from the reaction data 109, such that the emotional expression is not limited to a visual characteristic indicative of an emotional response, but can also include an audio characteristic indicative of an emotional responsive. For example, the processor 110 executing the emotional sensing module 202 can identify changes in breathing patterns, changes in tone and volume or tone of the user, and the like, to detect an emotional expression at different levels.

Referring to block 256 and block 258, one or more video features 210 are correlated or otherwise determined by the processor 110 to be related or to be the cause for the presence of the emotional features 208 as detected. In other words, the processor 110 identifies one or more of a video feature 210 that corresponds to one or more image frames of the plurality of video data streams 220 determined to elicit the emotional expression from the user. The machine learning module 206 may be executed by the processor 110 to access the video features 210 and the emotion features 208 in this step. Specifically, in some embodiments, the processor 110, via the machine learning module 206, analyzes the plurality of video data streams 220 and the reaction data 109 in parallel and identifies one or more of a video feature 210 (that elicits an emotional expression or response) of the plurality of video data streams 220 by identifying a range of time during which the emotional expression is observed in emotion features 208 of the reaction data 109, and drawing correlations/patterns via machine learning. In this step, the processor 110 predicts or suggest that the video feature 210 is defined by one or more frames of the plurality of video data streams 220 observable at the same time and/or just prior to the range of time that the emotional expression is observed in the emotion features 208 of the reaction data 109.

As indicated in FIG. 2A and FIG. 2C, the machine learning module 206 is executed by the processor 110 to generate the map 214 of video properties to emotional responses. The map 214 includes a mapping or correlation between the emotional expression and the video features 210. In other words, the map 214 informs that the video features 210 when presented to the user elicit the emotional expression observed in the emotion features 208 of the reaction data 109. The map 214 may include a plurality of such mappings such that a plurality of emotional expressions are correlated with a plurality of video features for reference and use as desired. The map 214 may further be refined as desired to tailor the video data streams 220 according to a desired emotional or emotion-based objective.

As indicated in FIG. 2C, the machine learning module 206 can include any number of machine learning components for generating the map 214, or otherwise contributing to the formation of the altered features 212. For example, the video features 210 may define video characteristics or vectors 272, and the emotional response labels 274 may be extrapolated from the emotion features 208, which may all be fed to a machine learning model 276, which may be a model including one or more of a support vector machine (SVM), a relevance vector machine (RVM), or a convolutional neural network (CNN). The machine learning model 276 when fed with the vectors 272 and the labels 274 over time is used to formulate and optimize a predictive model 278 or function (which can in turn assist with generating the map 214). In addition, when the predictive model 278 is fed with a desired emotional response input 284, the predictive model 278 outputs modified video characteristics 280 which can be applied to the video data streams 220 or other video content to elicit an actual emotional response 282 as desired. As a general example, where it is desired to increase happiness of the user viewing the video data streams 220, this desired emotional response of happiness is fed as an input in some form to the predictive model 278, and the predictive model 278 outputs a modified video characteristic 280 that can be applied to the video data streams 220 to elicit the actual (desired) emotional response 282 of an increased happiness of the user.

In some embodiments, the processor 110 generates the map 214 by executing the machine learning module 206 that, when fed continuously with the plurality of video data streams 220 and the reaction data 109, probes the reaction data 109 for changes in the emotional expression as visual components of the reaction data 109 change over time, and identifies as the video features 210 one or more corresponding frames of the plurality of video data streams 220 proximate to periods of the time during which the visual components of the reaction data 109 change over time. Characteristics of the video data streams 220 can be changed systematically (e.g., from high to low resolution in predetermined increments of x %) or randomly for the purpose of mapping. In some embodiments, the machine learning module 206 utilizes initial regression in view of a continuous video tuning loop from the plurality of video data streams 220 and the reaction data 109.

Referring to block 260, the video features 210 may be altered to consequently generate the altered features 212. The altered features 212 represent changes to one or more frames or video properties of the underlying video data streams 220 intended to elicit a change to the emotional expression previously observed by the reaction data 109. In some embodiments, the video features 210 are modified by adjusting image tonality, adjusting a resolution, or adjusting a field of view associated with one or more image frames of the plurality of video data streams 220, such changes being represented within or embodied by the altered features 212.

In some embodiments, the processor 110 is configured to continuously alter video features 210 in view of a new plurality of video data streams that also include video features 210 or similar features to continuously elicit the change in the emotional expression. In some embodiments, the processor 110 applies changes to new video data streams using the map 214 in real-time by detecting a presence of the video features 210 within the new video data streams and modifying the new video data streams according to parameters of the map 214.

Referring to block 262 (and as illustrated as 290 in FIG. 2B), the processor 110 executes an instruction to display to the user (e.g., Alice or Bob in FIG. 2A), the video data streams 220 with the altered features 212, via the output device 106 or otherwise. As described herein, the change applied to the video features 210, i.e., the altered features 212, elicits a change in the emotional expression or response previously detected. The change in the emotional expression includes, by non-limiting examples, a removal, reduction, or enhancement of the emotional expression. For example, where the video data streams 220 elicit a negative emotional response such as anger by a user, the change in this emotional response made by application of the altered features 212 to the video data streams 220 either amplifies the anger, reduces the anger, or removes the anger altogether from the user.

Figure 3:
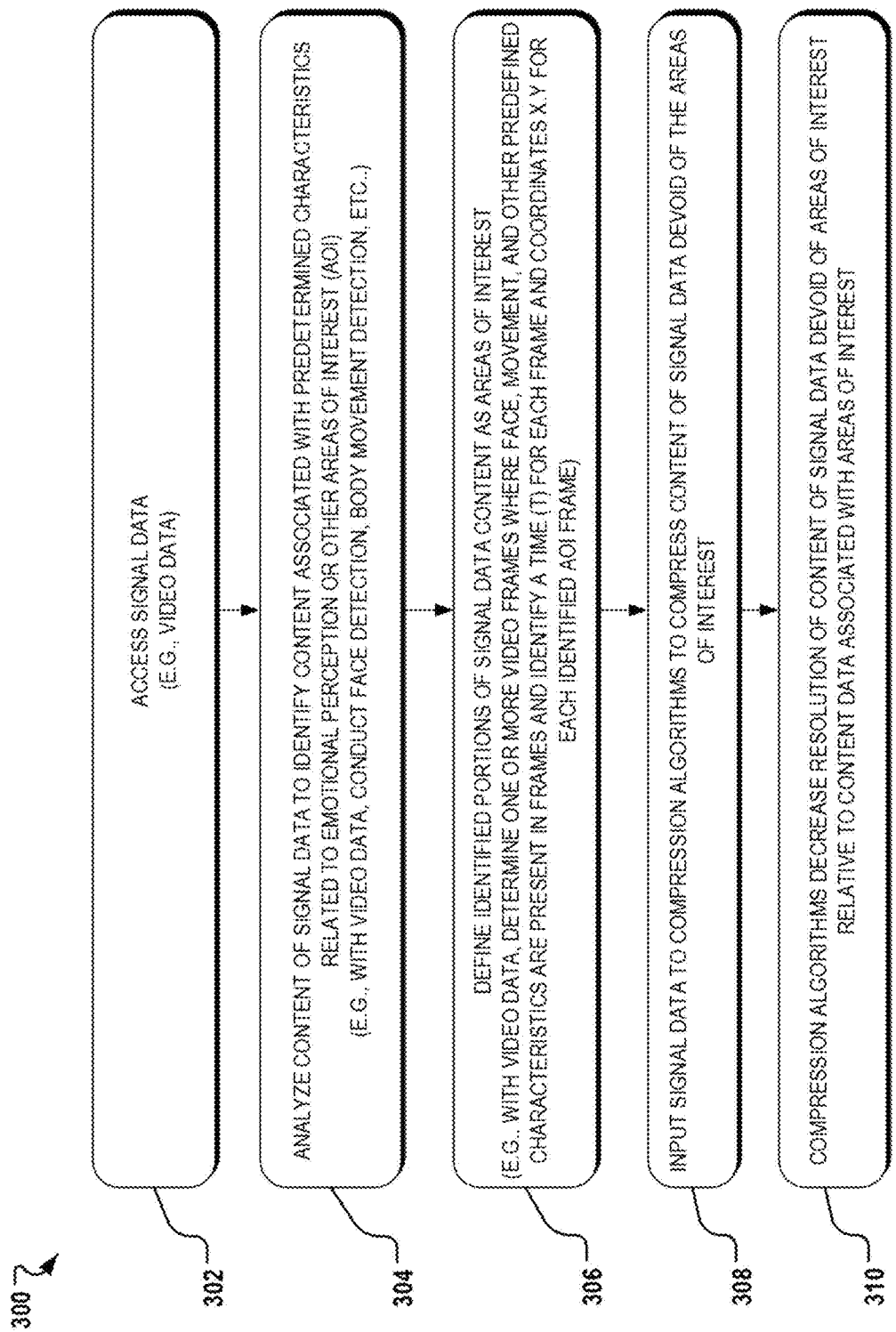
FIG. 3 is a process flow illustrating a method for applying the platform of FIG. 2A in the context of customized signal compression.
Figures 4A, 4B, 4C, 4D, 4E, 4F:
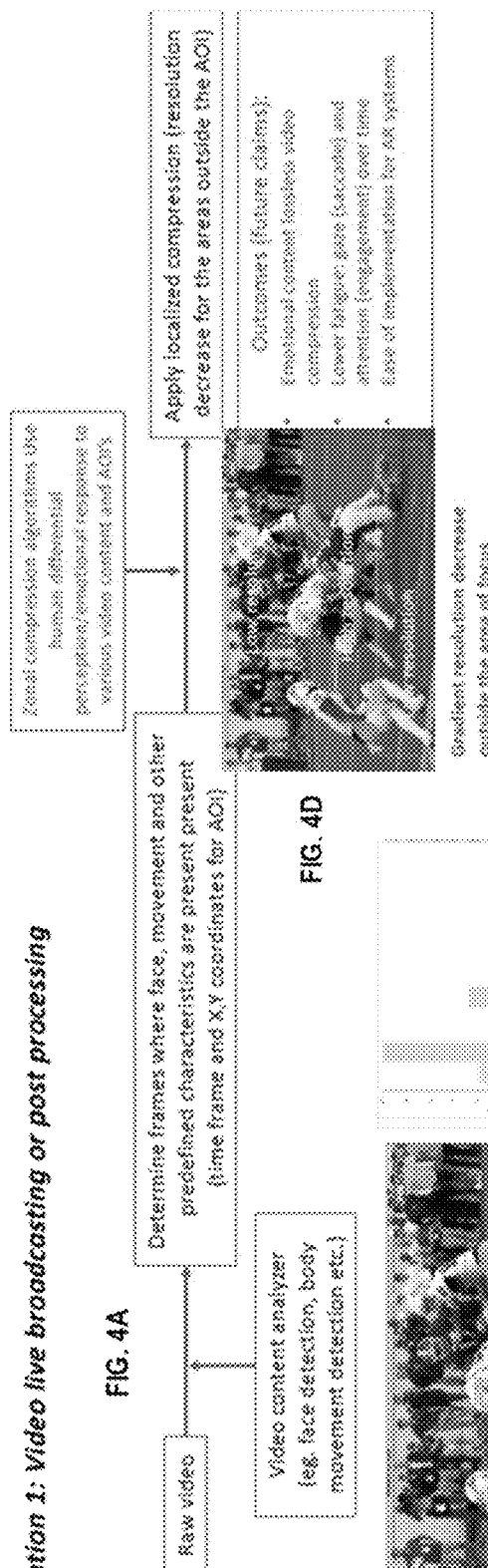
FIG. 4A is a process flow diagram related to an application of the system of FIG. 1 for live video broadcasting or post-processing.
FIG. 4B is a photograph illustrating gaze focus detection.
FIG. 4C is a photograph illustrating gaze focus detection.
FIG. 4D is a photograph illustrating gradient resolution decrease outside an area of interest or focus using selective compression.
FIG. 4E is a graph illustrating gaze focus and perception statistics by areas of interest.
FIG. 4F is a graph illustrating a gradient transition sigmoid for the content of the signal data associated with areas of interest (focus) compared with content outside/devoid of areas of interest.

Referring now to a process flow diagram 300 of FIG. 3, one general method of implementing the system 100 for emotion-based signal compression is illustrated. As indicated in block 302, the signal data 104 may first be accessed by the processor 110 of the computing device 102 in some manner. For example, the computing device 102 may access the signal data 104 from the content source device 105 via the network 120 via any communication protocol and optionally using an application programming interface (API). The signal data 104 may include video, image, or audio data or combinations thereof. Once accessed, the processor 110 may execute service 130A to format, clean, or otherwise preprocess the signal data 104 in any form.

Referring to block 304, the content detection service 130B may be executed by the processor 110 to identify content portions of the signal data 104 having any number of predefined characteristics. The predefined characteristics may include aspects of the signal data 104 defining emotion, focus of attention, a thematic sequence, or any specific areas of the signal data 104 where it is desired to highlight or emphasize such areas of whatever reason. For example, in the case where the signal data 104 defines audio data, predefined characteristics of the signal data 104 may include a chorus, a fight sequence, an emotional sequence, or any audiological areas where it is required to focus attention for whatever reason. In the case of image data or video data, predefined characteristics of the signal data 104 may include the face of a speaker of a presentation, movement of the face or body, an area of known important focus (e.g., in sports, the data associated with where the main activity of the sport is occurring such as the location of a ball), and the like.

Referring to block 306, the portions of the signal data 104 having any of the predefined characteristics may be labeled or deemed to be areas of interest, and such areas of interest may be organized time and location throughout the signal data 104. For example, areas of interest may be defined at a specific time (t) of a frame, and may related to X,Y coordinates (e.g., pixels of an image) or groups of such coordinates of the frame, such that a specific portion of a frame, at the time T, defines one area of interest.

Referring to block 308 and block 310, once areas of interest are labeled or otherwise identified and organized, the portions of the signal data 104 devoid of such areas of interest may be compressed or subjected to any number of compression techniques, thereby reducing the resolution of the signal data 104 across those areas. Alternatively or in combination, the portions of the signal data 104 having such areas of interest may be enhanced. In other embodiments, both the portions of the signal data 104 having the areas of interest and the portions of the signal data 104 devoid of such areas of interest may be compressed; however, the portions of the signal data 104 devoid of such areas of interest may be compressed to a lesser degree.

FIGS. 4A-4F and FIGS. 5A-5E illustrate further embodiments of the system 100 and implementation thereof. For example, FIGS. 4A-4F generally describe various functions and features for applying selection compression to video data by identifying predetermined areas of interest within the video data. FIGS. 5A-5E generally describes functions and features similar to FIGS. 4A-4F but illustrate that a localized color filter can be applied (e.g., red-shift tonality for PM receiving locations; and a blue-shift for AM receiving locations). Applying such a color filter can further emphasize or de-emphasize portions of video data so that focus is drawn to the defined areas of interest. Other related embodiments are contemplated.

Exemplary Computing Device

Figure 6:
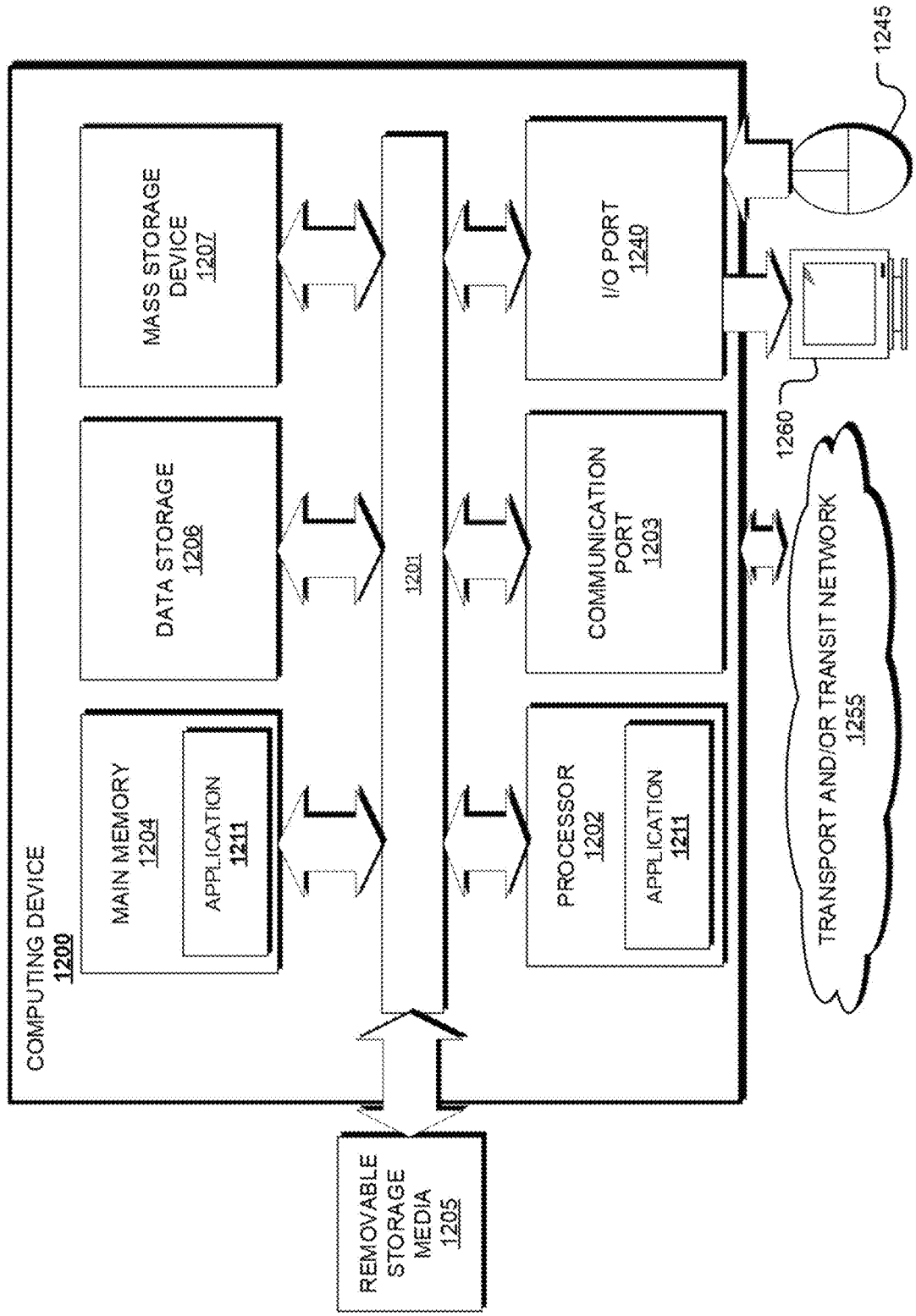
FIG. 6 is a simplified block diagram of an exemplary computing device that may be implemented to execute functionality described herein.

Referring to FIG. 6, a computing device 1200 is illustrated which may take the place of the computing device 102 and be configured, via one or more of an application 1211 or computer-executable instructions, to execute functionality described herein. More particularly, in some embodiments, aspects of the predictive methods herein may be translated to software or machine-level code, which may be installed to and/or executed by the computing device 1200 such that the computing device 1200 is configured to modify video properties and conduct emotion-based signal compression, and other functionality described herein. It is contemplated that the computing device 1200 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 1200 may include various hardware components, such as a processor 1202, a main memory 1204 (e.g., a system memory), and a system bus 1201 that couples various components of the computing device 1200 to the processor 1202. The system bus 1201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 1200 may further include a variety of memory devices and computer-readable media 1207 that includes removable/non-removable media and volatile/nonvolatile media and/or tangible media, but excludes transitory propagated signals. Computer-readable media 1207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 1200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 1204 includes computer storage media in the form of volatile/nonvolatile memory such as read only memory (ROM) and random access memory (RAM). A basic input/output system (BIOS), containing the basic routines that help to transfer information between elements within the computing device 1200 (e.g., during start-up) is typically stored in ROM. RAM typically contains data and/or program modules that are immediately accessible to and/or presently being operated on by processor 1202. Further, data storage 1206 in the form of Read-Only Memory (ROM) or otherwise may store an operating system, application programs, and other program modules and program data.

The data storage 1206 may also include other removable/non-removable, volatile/nonvolatile computer storage media. For example, the data storage 1206 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 1200.

A user may enter commands and information through a user interface 1240 (displayed via a monitor 1260) by engaging input devices 1245 such as a tablet, electronic digitizer, a microphone, keyboard, and/or pointing device, commonly referred to as mouse, trackball or touch pad. Other input devices 1245 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 1245 are in operative connection to the processor 1202 and may be coupled to the system bus 1201, but may be connected by other interface and bus structures, such as a parallel port, game port or a universal serial bus (USB). The monitor 1260 or other type of display device may also be connected to the system bus 1201. The monitor 1260 may also be integrated with a touch-screen panel or the like.

The computing device 1200 may be implemented in a networked or cloud-computing environment using logical connections of a network interface 1203 to one or more remote devices, such as a remote computer. The remote computer may be a personal computer, a server, a router, a network PC, a peer device or other common network node, and typically includes many or all of the elements described above relative to the computing device 1200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 1200 may be connected to a public and/or private network through the network interface 1203. In such embodiments, a modem or other means for establishing communications over the network is connected to the system bus 1201 via the network interface 1203 or other appropriate mechanism. A wireless networking component including an interface and antenna may be coupled through a suitable device such as an access point or peer computer to a network. In a networked environment, program modules depicted relative to the computing device 1200, or portions thereof, may be stored in the remote memory storage device.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 1202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Computing systems or devices referenced herein may include desktop computers, laptops, tablets e-readers, personal digital assistants, smartphones, gaming devices, servers, and the like. The computing devices may access computer-readable media that include computer-readable storage media and data transmission media. In some embodiments, the computer-readable storage media are tangible storage devices that do not include a transitory propagating signal. Examples include memory such as primary memory, cache memory, and secondary memory (e.g., DVD) and other storage devices. The computer-readable storage media may have instructions recorded on them or may be encoded with computer-executable instructions or logic that implements aspects of the functionality described herein. The data transmission media may be used for transmitting data via transitory, propagating signals or carrier waves (e.g., electromagnetism) via a wired or wireless connection.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A computer-implemented system for automated modification of video data according to desired emotional characteristics, comprising:
    a codec that encodes and decodes data from a plurality of video data streams;
    a camera that captures reaction data of a user viewing the plurality of video data streams via a display; and
    a processor associated with the codec that accesses the reaction data from the camera and the plurality of video data streams, the processor adapted to:
        detect an emotional expression from the reaction data and a feature of the plurality of video data streams that elicits the emotional expression,
        generate a map of video properties to emotional responses by the user from the reaction data, the emotional expression being mapped to the feature of the plurality of video data streams,
        refine the map to define a selective modification to the feature and corresponding image frames of the plurality of video data streams for selective emotional enhancement of the emotional expression,
        modify the plurality of video data streams in view of the map as refined to generate a revised plurality of video data streams with the feature and corresponding image frames of the plurality of video data streams selectively modified by the map as refined, and execute an instruction to display to the user the revised plurality of video data streams with the feature as modified by the map to elicit the selective emotional enhancement of the emotional expression.

2. The computer-implemented system of claim 1, wherein the processor is configured to continuously alter the feature in view of a new plurality of video data streams that include the feature to continuously elicit a change in the emotional expression.

3. The computer-implemented system of claim 2, wherein the feature corresponds to one or more image frames of the plurality of video data streams determined by the processor to elicit the emotional expression from the user.

4. The computer-implemented system of claim 2, wherein the change in the emotional expression is a removal, reduction, or enhancement of the emotional expression.

5. The computer-implemented system of claim 1, wherein the emotional expression is identified by the processor from reaction image frames of the reaction data, the reaction image frames defining emotional characteristics including predetermined movements, predetermined facial expressions, or predetermined changes in focus areas of an image.

6. The computer-implemented system of claim 1, wherein the feature is modified by adjusting image tonality, adjusting a resolution, or adjusting a field of view associated with one or more image frames of the plurality of video data streams.

7. The computer-implemented system of claim 1, wherein the processor generates the map by executing a machine learning module that, when fed continuously with the plurality of video data streams and the reaction data, probes the reaction data for changes in the emotional expression as visual components of the reaction data change over time, and identifies as features one or more corresponding frames of the plurality of video data streams proximate to periods of the time during which the visual components of the reaction data change over time.

8. The computer-implemented system of claim 7, wherein the machine learning module utilizes initial regression in view of a continuous video tuning loop from the plurality of video data streams and the reaction data.

9. The computer-implemented system of claim 7, wherein the processor, via the machine learning module, analyzes the plurality of video data streams and the reaction data in parallel and identifies the feature of the plurality of video data streams by identifying a range of time during which the emotional expression is observed in the reaction data, and suggesting the feature is defined by one or more frames of the plurality of video data streams observable just prior to the range of time and the emotional expression observed in the reaction data.

10. The computer-implemented system of claim 1, wherein the processor applies changes to new video data streams using the map in real-time by detecting a presence of the feature within the new video data streams and modifying the feature according to parameters of the map.

11. The system of claim 1, wherein the feature of the plurality of video data streams is defined by an area of interest associated with the emotional expression, and the processor is further adapted to:

apply selective localized compression to portions of the plurality of video data streams outside the area of interest.

12. A method for selective modification of video properties according to a predetermined emotional characteristic objective, comprising:

accessing a video data stream by a processor;

generating, by the processor, a map of video properties to emotional responses from the video data stream, including:

displaying the video data stream to a user, detecting an emotional feature associated with an emotional expression from reaction data captured by a camera and accessed by the processor as the user views the video data stream, and detecting a video feature related to the emotional feature and further corresponding to one or more image frames of the video data stream; and modifying, selectively by the processor, the one or more image frames for selective emotional tuning of the emotional expression.

13. A method of signal compression and alteration based on predetermined content, comprising:

accessing signal data by a processor;

analyzing the signal data, by the processor, to search for portions of the signal data having areas of interest related to predefined characteristics;

defining, by the processor, certain portions of the signal data as being associated with the areas of interest; and applying, by the processor, compression to portions of the signal data devoid of the areas of interest to reduce resolution.

14. The method of claim 13, wherein the predefined characteristics include predetermined movements, predetermined facial expressions, predetermined portions of audio, and predetermined focus areas of an image.

* * * * *